(12) United States Patent
Kuniba (10) Patent No.: US 8,150,099 B2
(45) Date of Patent: Apr. 3, 2012

(54) IMAGE PROCESSING DEVICE, IMAGE PROCESSING METHOD, IMAGE PROCESSING PROGRAM PRODUCT, AND IMAGING DEVICE

(75) Inventor: Hideyasu Kuniba, Rochester, NY (US)

(73) Assignee: Nikon Corporation, Tokyo (JP)

( * ) Notice: Subject to any disclaimer, the term of this patent is extended or adjusted under 35 U.S.C. 154(b) by 1105 days.

(21) Appl. No.: 11/921,082

(22) PCT Filed: May 29, 2006

(86) PCT No.: PCT/JP2006/310661
§ 371 (c)(1),
(2), (4) Date: Dec. 11, 2007

(87) PCT Pub. No.: WO2006/129601
PCT Pub. Date: Dec. 7, 2006

(65) Prior Publication Data
US 2008/0292145 A1    Nov. 27, 2008

(30) Foreign Application Priority Data
Jun. 3, 2005   (JP) .................................. 2005-163814

(51) Int. Cl.
*G06K 9/00* (2006.01)
(52) U.S. Cl. ........ 382/103; 382/118; 382/173; 382/190; 382/274
(58) Field of Classification Search .................. 382/103, 382/118, 167, 173, 190, 274, 275; 348/222.1, 348/223.1, 239
See application file for complete search history.

(56) References Cited

U.S. PATENT DOCUMENTS

| | | | |
|---|---|---|---|
| 5,991,456 A | 11/1999 | Rahman et al. | |
| 7,366,350 B2 * | 4/2008 | Kajihara | 382/167 |
| 7,548,260 B2 * | 6/2009 | Yamaguchi | 348/239 |
| 7,570,840 B2 * | 8/2009 | Imai | 382/286 |
| 7,656,456 B2 * | 2/2010 | Zhang | 348/362 |
| 7,881,504 B2 * | 2/2011 | Kagaya et al. | 382/118 |
| 2001/0005222 A1 * | 6/2001 | Yamaguchi | 348/223 |
| 2002/0015514 A1 | 2/2002 | Kinjo | |
| 2004/0156544 A1 * | 8/2004 | Kajihara | 382/167 |
| 2005/0036709 A1 | 2/2005 | Imai | |
| 2006/0238642 A1 * | 10/2006 | Goto | 348/370 |
| 2007/0052838 A1 * | 3/2007 | Zhang | 348/362 |
| 2007/0070214 A1 * | 3/2007 | Nakamura | 348/222.1 |

(Continued)

FOREIGN PATENT DOCUMENTS
EP    0 601 363 A2    6/1994

(Continued)

OTHER PUBLICATIONS

Aihara, Nobuhiro; Machine Translation of JP 2002-232728, Published Aug. 2002.*

(Continued)

*Primary Examiner* — Aaron W Carter
(74) *Attorney, Agent, or Firm* — Oliff & Berridge, PLC (57) ABSTRACT

An image processing device includes: a face detection unit that detects a face region of a person from an image formed by a plurality of pixels; and a scene judgment unit that judges a scene of the image according to a pixel value of the face region of the person detected by the face detection unit and a pixel value of a nonface region excluding the face region in the image.

12 Claims, 8 Drawing Sheets

U.S. PATENT DOCUMENTS

| | | | |
|---|---|---|---|
| 2008/0292145 A1* | 11/2008 | Kuniba | 382/118 |
| 2009/0073275 A1* | 3/2009 | Awazu | 348/222.1 |
| 2010/0020341 A1* | 1/2010 | Enjuji | 358/1.9 |
| 2010/0027072 A1* | 2/2010 | Enjuji | 358/3.01 |

FOREIGN PATENT DOCUMENTS

| | | | |
|---|---|---|---|
| JP | B2-6-040198 | | 5/1994 |
| JP | B2 2848750 | | 11/1998 |
| JP | A-2001-100087 | | 4/2001 |
| JP | A-2002-77592 | | 3/2002 |
| JP | A-2002-135559 | | 5/2002 |
| JP | 2002-232728 | * | 8/2002 |
| JP | A-2003-69846 | | 3/2003 |
| JP | A-2004-021374 | | 1/2004 |
| JP | A-2004-341901 | | 12/2004 |
| JP | A-2004-363898 | | 12/2004 |
| JP | A-2005-51407 | | 2/2005 |
| JP | A-2005-130484 | | 5/2005 |

OTHER PUBLICATIONS

Foreign Office Action drafting date: Jan. 26, 2011 and notification date: Feb. 1, 2011 in Japanese Application No. 2007-518967 (with translation).

* cited by examiner

FIG. 8

# IMAGE PROCESSING DEVICE, IMAGE PROCESSING METHOD, IMAGE PROCESSING PROGRAM PRODUCT, AND IMAGING DEVICE

TECHNICAL FILED

The present invention relates to an image processing device, an image processing method, and an image processing program product for processing an image, as well as an imaging device for capturing an image.

BACKGROUND ART

A main image detection method as described below is known from Patent Document 1. The main image detection method includes detecting a main image in an image by color density determination and performing a scene judgment based on an image feature quantity of the main image.

Patent Document 1: Japanese Examined Patent Publication No. H06-40198.

DISCLOSURE OF THE INVENTION

Problem to be Solved by the Invention

However, in the conventional method, the color of an object having high likelihood of providing a main image is selected as a reference color and color density determination is performed to detect a main image. Accordingly, a problem arises in that when the reference color is present in a portion other than the object whose image is desired to be made a main image, there is a possibility that the main image is erroneously detected and that scenes are erroneously judged.

Means for Solving the Problem

According to the 1st aspect of the present invention, an image processing device comprises: a face detection unit that detects a face region of a person from an image formed by a plurality of pixels; and a scene judgment unit that judges a scene of the image according to a pixel value of the face region of the person detected by the face detection unit and a pixel value of a nonface region excluding the face region in the image.

According to the 2nd aspect of the present invention, in the image processing device according to the 1st aspect, it is preferred that the image processing device further comprises a tone correction unit that performs different tone correction to the image depending on the scene of the image judged by the scene judgment unit.

According to the 3rd aspect of the present invention, in the image processing device according to the 1st aspect, it is preferred that the image processing device further comprises: a parameter value setting unit that sets a parameter value of a tone correction parameter to per for tone correction to the image depending on the scene of the image judged by the scene judgment unit; and a tone correction unit that performs tone correction to the image based on the parameter value set by the parameter value setting unit.

According to the 4th aspect of the present invention, in the image processing unit according to any one of the 1st through the 3rd aspects, it is preferred that: the scene judgment unit judges based on the pixel value of the face region and the pixel value of the nonface region that (1) if a difference between the pixel value of the face region and the pixel value of the nonface region is less than a predetermined value, the scene of the image is a normal scene, (2) if the pixel value of the nonface region is greater than the pixel value of the face region by a predetermined value or more, the scene of the image is a backlit scene, or (3) if the pixel value of the face region is greater than the pixel value of the nonface region by a predetermined value or more, the scene of the image is a night scene.

According to the 5th aspect of the present invention, in the image processing device according to any one of the 1st through the 3rd aspects, it is preferred that: the image processing device further comprises a scene setting unit that sets a distribution of a set of the pixel value of the face region and the pixel value of the nonface region divided in advance into a range corresponding to a normal scene, a range corresponding to a backlit scene, and a range corresponding to a night scene; and the scene judgment unit judges the scene of the image by judging which one of the ranges set by the scene setting unit the set of the pixel of the face region and the pixel of the nonface region of the image is included in.

According to the 6th aspect of the present invention, in the image processing device according to the 3rd aspect, it is preferred that: the scene judgment unit judges, based on the pixel value of the face region and the pixel value of the nonface region, that (1) if a difference between the pixel value of the face region and the pixel value of the nonface region is less than a predetermined value, the scene of the image is a normal scene, (2) if the pixel value of the nonface region is greater than the pixel value of the face region by a predetermined value or more, the scene of the image is a backlit scene, or (3) if the pixel value of the face region is greater than the pixel value of the nonface region by a predetermined value or more, the scene of the image is a night scene; the tone correction parameter is a parameter that controls a pixel value of each pixel of the image; and the parameter setting unit (4) sets the parameter value so as not to perform tone correction to the image, if the scene of the image is judged by the scene judgment unit to be a normal scene, (5) sets the parameter value so that tone correction is performed to make the image brighter than the original image, if the scene of the image is judged to be a backlit scene, or (6) sets the parameter value so that tone correction is performed to make the image brighter than the original image but more weakly than the tone correction in the backlit scene, if the scene of the image is judged to be a night scene.

According to the 7th aspect of the present invention, an image processing method, comprises: detecting a face region of a person from an image formed by a plurality of pixels, and judging a scene of the image based on a pixel value of the detected face region of the person and a pixel value of a nonface region excluding the face region in the image.

According to the 8th aspect of the present invention, in the image processing method according to the 7th aspect, it is preferred that the image processing method further comprises performing different tone correction to the image depending on the judged scene of the image.

According to the 9th aspect of the present invention, in the image processing method according to the 7th aspect, it is preferred that the image processing method further comprises: setting a parameter value of a tone correction parameter for performing tone correction to the image depending on the judged scene of the image; and performing tone correction to the image based on the set parameter value.

According to the 10th aspect of the present invention, in the image processing method according to any one of the 7th through the 9th aspects, it is preferred that when the scene of the image is judged based on the pixel value of the face region and the pixel value of the nonface region, (1) the scene of the image is judged to be a normal scene, if a difference between the pixel value of the face region and the pixel value of the nonface region is less than a predetermined value, (2) the scene of the image is judged to be a backlit scene, if the pixel value of the nonface region is greater than the pixel value of the face region by a predetermined value or more, or (3) the scene of the image is judged to be a night scene, if the pixel value of the face region is greater than the pixel value of the nonface region by a predetermined value or more.

According to the 11th aspect of the present invention, in the image processing method according to any one of the 7th through the 9th aspects, it is preferred that: the image processing method further comprises setting a distribution of a set of the pixel value of the face region and the pixel value of the nonface region divided in advance into a range corresponding to a normal scene, a range corresponding to a backlit scene, and a range corresponding to a night scene; and the judging a scene is performed by judging which one of the ranges set by the scene setting unit the set of the pixel of the face region and the pixel of the nonface region of the image is included in.

According to the 12th aspect of the present invention, in the image processing method according to the 9th aspect, it is preferred that: when the scene of the image is judged based on the pixel value of the face region and the pixel value of the nonface region, (1) the scene of the image is judged to be a normal scene, if a difference between the pixel value of the face region and the pixel value of the nonface region is less than a predetermined value, (2) the scene of the image is judged to be a backlit scene, if the pixel value of the nonface region is greater than the pixel value of the face region by a predetermined value or more, or (3) the scene of the image is judged to be a night scene, if the pixel value of the face region is greater than the pixel value of the nonface region by a predetermined value or more: the tone correction parameter is a parameter that controls the pixel value of each pixel of the image; and the parameter value is set (4) so as not to perform tone correction to the image, if the scene of the image is judged to be a normal scene, (5) so that tone correction is performed to make the image brighter than the original image, if the scene of the image is judged to be a backlit scene, or (6) sets the parameter value so that tone correction is performed to make the image brighter than the original image but more weakly than the tone correction in the backlit scene, if the scene of the image is judged to be a night scene.

According to the 13th aspect of the present intention, a computer readable computer program product comprises an image processing program for causing the computer to execute the image processing method according to any one of the 7th through the 12th aspects.

According to the 14th aspect of the present invention, in the imaging device comprises: an image sensor that captures an image; a storing unit that stores therein the image captured by the image sensor; a controlling unit that executes an image processing program that constitutes a computer program product according to the 13, and the controlling unit executes the image processing program to perform tone correction processing to the image stored in the storing unit.

ADVANTAGEOUS EFFECT OF THE INVENTION

According to the present invention, main images can be detected with high precision and scenes can be correctly judged, since the face of a person is generally a main image.

BEST MODE FOR CARRYING OUT THE INVENTION

Figure 1:
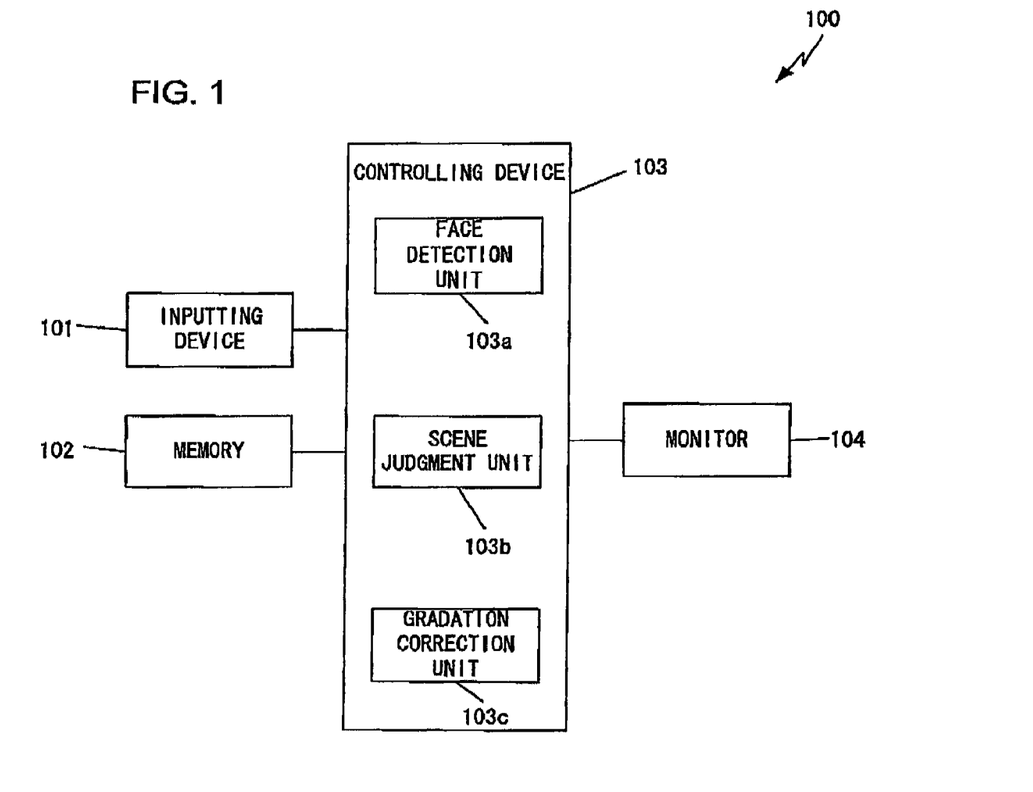
FIG. 1 is a block diagram showing a construction of an example of the image processing device according to one embodiment of the present invention.

FIG. 1 is a block diagram showing a construction of an example of the image processing device according to one embodiment of the present invention. An image processing device 100 is, for example, a personal computer, which includes an inputting device 101 operated by a user, such as a mouse, a keyboard or an entry switch, a memory 102 that stores an image data that is a target of image processing and an image processing program, a controlling device 103 that is made up by a CPU and other peripheral circuits and reads the image processing program stored in the memory 102 to perform an image processing, and a monitor 104 that outputs the image.

The image data to be stored in the memory 102 is data of an image that has been captured by, for example, a digital camera, the image data is made up by a plurality of pixels, and the image data is presented in an RGB color system. It is assumed that each pixel that constitutes the image data has color information on each color component of RGB. Here, the term "color information on each color component of R, G and B" means an intensity signal (pixel value) of each color expressed by 0 to 225 levels and brightness of each pixel is determined based on the intensity signal of each color. Hereinafter, each intensity signal of R, G and B is referred to simply as R, G and B.

The controlling device 103 has a face detection unit 103a, a scene judgment unit 103b, and a tone correction unit 103c. The face detection unit 103a detects an image portion corresponding to a face of a person contained in an image by a conventional face detection method when the image which is selected by a user as a target of the image processing is being displayed in the monitor 104 and the inputting device 101 is operated by the user to instruct the face detection unit to start the image processing. In the present embodiment, for example, the image is divided into small regions each having a predetermined size, and a pattern of brightness or hue of pixel of each small region is compared with predetermined patterns of brightness or hue of face. Then, assuming that the face of a person is present in a small region that has brightness or hue of face corresponding with one of the predetermined brightness or hue patterns of face, such a small region is detected as a region containing the face of a person (face region).

It is to be noted that when a plurality of faces are present in an image, the face region having the largest area among the plurality of face regions detected by the face detection processing may be selected as a subject to be submitted to various types of processing detailed below or the face detection processing may be completed when one face region has been detected in the image. Also, all the face regions may be targeted.

Figure 2:
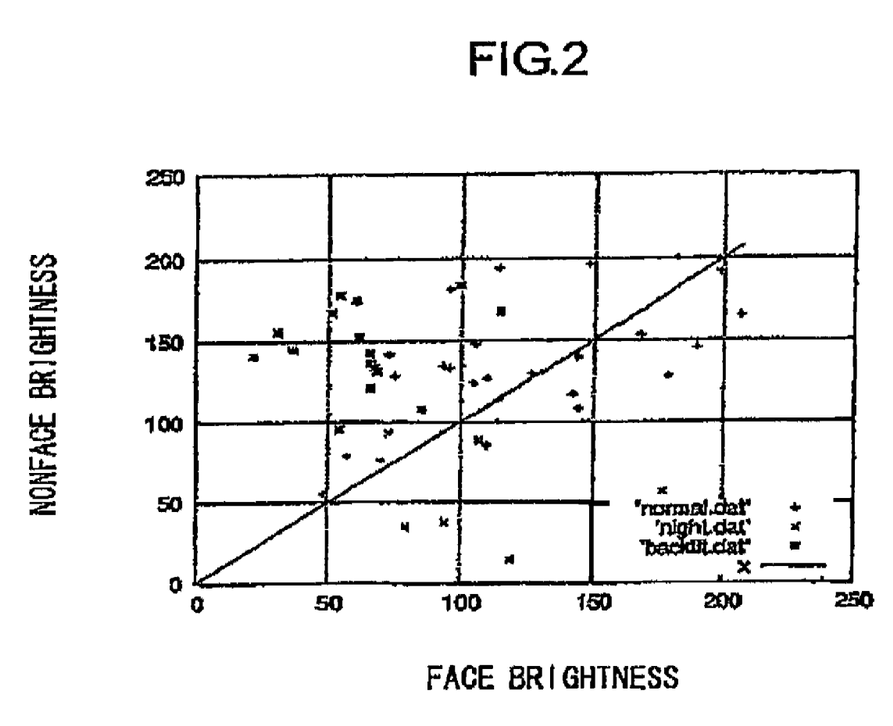
FIG. 2 is a graph illustrating a scene-based distribution of brightness in a face region and brightness in a nonface region.

The scene judgment unit 103b judges a scene of an image based on brightness of the face region detected by the face detection unit 103a and brightness of a region other than the face region in the image. That is, the scene of an image is judged taking into consideration that there is the relationship as shown in FIG. 2 detailed later between the scene of the image and the distributions of brightness of the face region and of brightness of the nonface region. It is to be noted that in the present embodiment, an average value of brightness of pixels contained in the face region and an average value of brightness of pixels contained in the nonface region are defined to be brightness values of respective regions and a judgment is made which one of a normal scene, a backlit scene or a night scene the scene of the image is.

FIG. 2 is a graph showing scene-based distributions of the brightness in a face region and the brightness of a nonface region prepared based on experimental values. FIG. 2 is prepared by plotting the distribution of brightness in a normal scene (normal.dat), the distribution of brightness in a backlit scene (backlit.dat), and the distribution of brightness in a night scene (night.dat) where the horizontal axis represents brightness of a face region and the vertical axis represents brightness of a nonface region. That is, FIG. 2 is a graph showing results of a procedure including calculating brightness of a face region and brightness of a nonface region of images captured in each scene and plotting a point identified by a set of the brightness of the face region and the brightness of the nonface region on the graph in FIG. 2, and repeating this procedure on a plurality of images for each scene.

The graph in FIG. 2 indicates that the brightness distribution in each scene has the features shown in (A) to (C) below.

(A) Normal Scenes

In normal scenes, the brightness of a face region and the brightness of a nonface region distribute without a great difference therebetween. That is, the difference between the brightness (pixel value) of the face region and the brightness (pixel value) of the nonface region is below a predetermined value.

(B) Backlit Scenes

In backlit scenes, the brightness of the nonface region is higher than the brightness of the face region. That is, the pixel value of the nonface region is greater than the pixel value of the face region.

(C) Night Scenes

In night scenes, the brightness of the face region is higher than the brightness of the nonface region. That is, the pixel value of the face region is greater than the pixel value of the nonface region.

The scene judgment unit 103b calculates the brightness of the face region and the brightness of the nonface region in the image that is a subject of a judgment and judges which one of brightness distributions (A) to (C) the point identified on the graph in FIG. 2 by a set of the brightness of the face region and the brightness of the nonface region corresponds to in order to determine the scene of the image.

Figure 3:
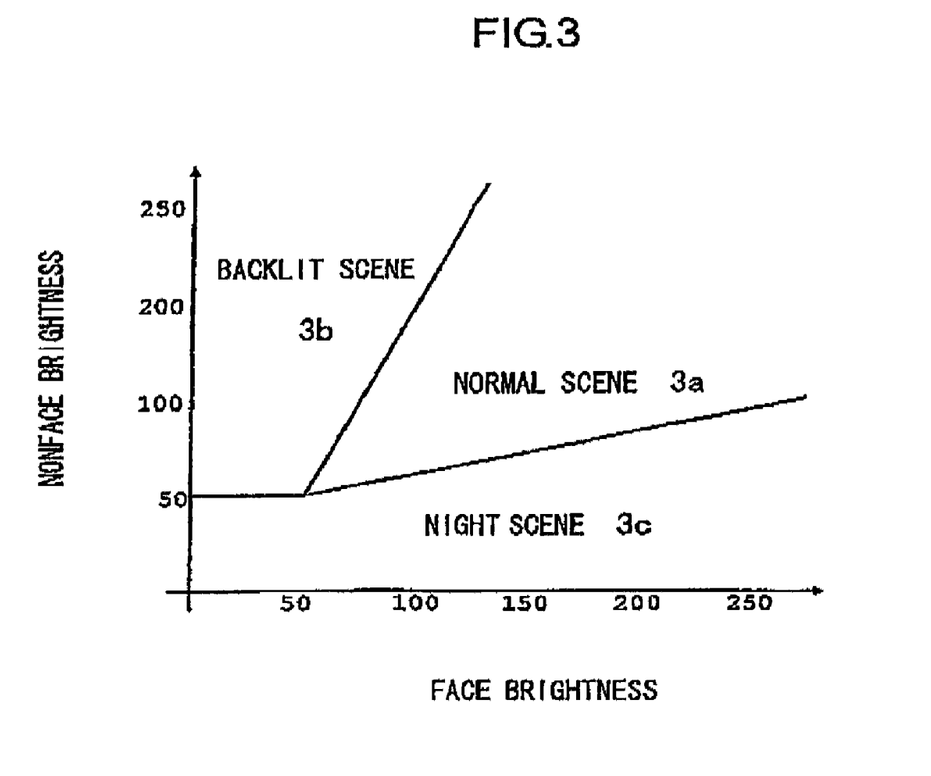
FIG. 3 is a diagram showing a specific example of a scene judgment based on the distribution of brightness in a face region and brightness in a nonface region.

It is to be noted that in the present embodiment, distribution ranges of the brightness of the face region and the brightness of the nonface region in FIG. 2 are divided as shown in FIG. 3 in order to judge which one of (A) to (C) described above an image corresponds to according to the brightness distribution shown in FIG. 2. That is, the distribution ranges are divided into a normal scene range 3a that matches condition (A), a backlit scene range 3b that matches condition (B), and a night scene range 3c that matches condition (C). Then, a judgment is made as to which one of these ranges (regions) the point identified by the brightness of the face region and the brightness of the nonface region in the image being a subject of determination is included in so as to determine the scene of the image. It is to be noted that data relating to the ranges of the distributions of brightness of the face region and of brightness of the nonface region divided as shown in FIG. 3 may be tabulated and stored (set) in advance in the memory 102.

When the scene of an image is determined by the scene judgment unit 103b, the tone correction unit 103c sets a parameter value of a tone correction parameter depending on the scene and performs tone correction processing using the set parameter value. It is to be noted that in the present embodiment, tone correction of images is performed by the known Retinex tone correction processing disclosed in, for example, U.S. Pat. No. 5,991,456. However, regarding a tone correction amount in the processing, the value of a parameter that controls the brightness of an image (parameter that controls a degree of illuminating an image), i.e., Shadow parameter, which is a tone correction parameter correcting gradation of an image, may be set appropriately so as to perform preferred tone correction processing.

The value of Shadow parameter can be set in the range of 0 (no correction) to 100, with a tendency that a greater value shows a higher brightness of the image after the tone correction. Then, the gradation of the corrected image is determined by obtaining a weighted average of the brightness of the Retinex-processed image and the brightness of the original image depending on the parameter value. Evaluation of the images after the above-mentioned tone correction processing of the images for each scene resulted in a score distribution of the parameter value as shown in FIG. 4 in which the whole image can be made brighter than the original images while keeping the contrast value at the same level.

Figure 4:
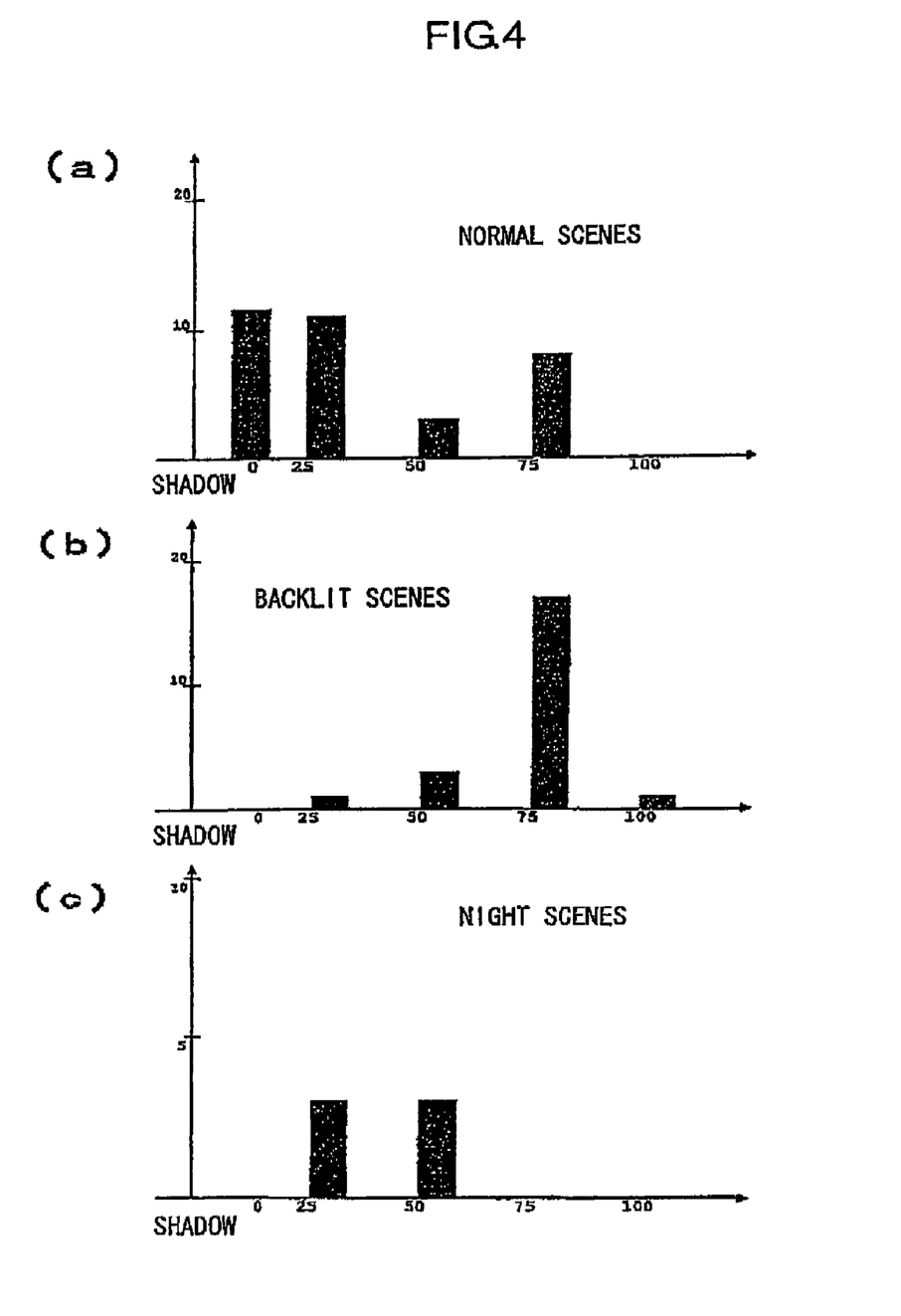
FIG. 4 is a diagram showing results of evaluation of images after correction by Retinex tone correction processing of each scene with a 5-level Shadow parameter.

That is, in the case of the images in normal scenes, optimal output results can usually be obtained when the tone correction processing is performed by setting the value of the Shadow parameter to 0 as shown in FIG. 4(*a*). In the case of the images in backlit scenes, usually images whose dark portions are also brighter than the original images can be obtained to provide optimal output results when the tone correction processing is performed by setting the parameter value to 75 as shown in FIG. 4(*b*). Further, in the case of the images in night scenes, images having a dark portion that is not too bright but is so bright as to make its content discernible can usually be obtained to provide optimal output results when the tone correction processing is performed by setting the parameter value to 25 or 50 as shown in FIG. 4(*c*).

In other words, the tone correction processing of images in normal scenes is performed by setting the value of the Shadow parameter to 0. That is, optimal output images can be obtained when no tone correction is performed. On the other hand, the tone correction processing of images in backlit scenes is performed by setting the value of the Shadow parameter to 75. That is, optimal images in which the whole images are made brighter than the original images while keeping the contrast at the same level can be obtained. The tone correction processing of images in night scenes is performed by setting the value of the Shadow parameter to 25. That is, optimal images can be obtained by performing tone correction to a brightness that is weaker than that in the case of the images in backlit scenes.

As described above, the tone correction unit 103c performs Retinex tone correction processing by setting the value of the Shadow parameter to a value at which optimal output results can be obtained as a scene-based parameter for each scene depending on the scene of image judged by the scene judgment unit 103b and outputs the corrected images to the monitor 104. That is, the tone correction unit 103c sets different values of the Shadow parameter depending on the scene of the image judged by the scene judgment unit 103b, so that optimal output results can be obtained. As a result, as compared with the case in which the tone correction processing is performed using a common value of the Shadow parameter regardless of the scene, images having received tone correction to an optimal brightness while keeping the contrast on the same level can be obtained.

Figure 5:
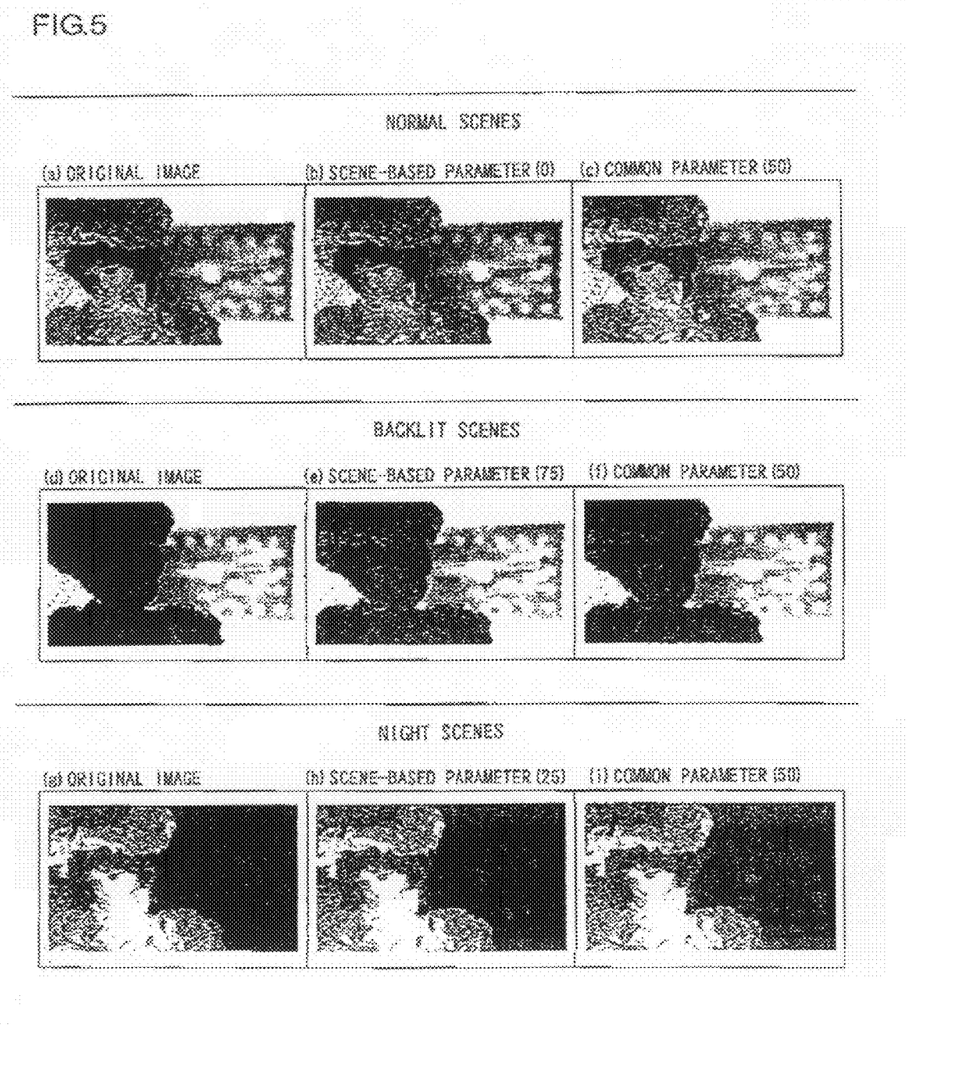
FIG. 5 is a diagram showing specific examples of images after tone correction of original images procured in respective scenes by setting scene-based parameters and a common parameter.

FIG. 5 is a diagram showing specific examples of images obtained after tone correction of images procured in each scene (original images) by setting the above-mentioned scene-based parameter or by setting a common parameter obtained by setting the value of the Shadow parameter to 50 regardless of the scene of the image When the scene is a normal scene, the image after tone correction performed on the original image shown in FIG. 5(a) by setting the scene-based parameter (parameter value=0) is shown in FIG. 5(b). Also, the image after tone correction performed on the original image by setting the common parameter (parameter value=50) is shown in FIG. 5(c). As described above, when tone correction is performed by setting the common parameter, the image becomes too bright, whereas an image having optimal brightness can be obtained when tone correction is performed by setting the scene-based parameter, that is, when no tone correction is performed.

When the scene is a backlit scene, the image after tone correction performed on the original image shown in FIG. 5(d) by setting the scene-based parameter (parameter value=75) is shown in FIG. 5(e). Also, the image after tone correction performed on the original image by setting the common parameter is shown in FIG. 5(f). As described above, when tone correction is performed by setting the common parameter, the image still remains in a dark state; especially, the face of the person, which is a main object, is in a dark state. On the contrary, when tone correction is performed by setting the scene-based parameter, an image whose gradation is corrected so that the whole image is made sufficiently bright and at the same time, the face of a person is displayed clearly.

When the scene is a night scene, the image after tone correction performed on the original image shown in FIG. 5(g) by setting the scene-based parameter (parameter value=25) is shown in FIG. 5(h). Also, the image after tone correction performed on the original image by setting the common parameter is shown in FIG. 5(i). As described above, when tone correction is performed by setting the common parameter, the image becomes too bright, whereas when tone correction is performed by setting the scene-based parameter, tone correction is achieved so as to provide a sufficient brightness, resulting in that an image having an optimal brightness can be obtained.

Figure 6:
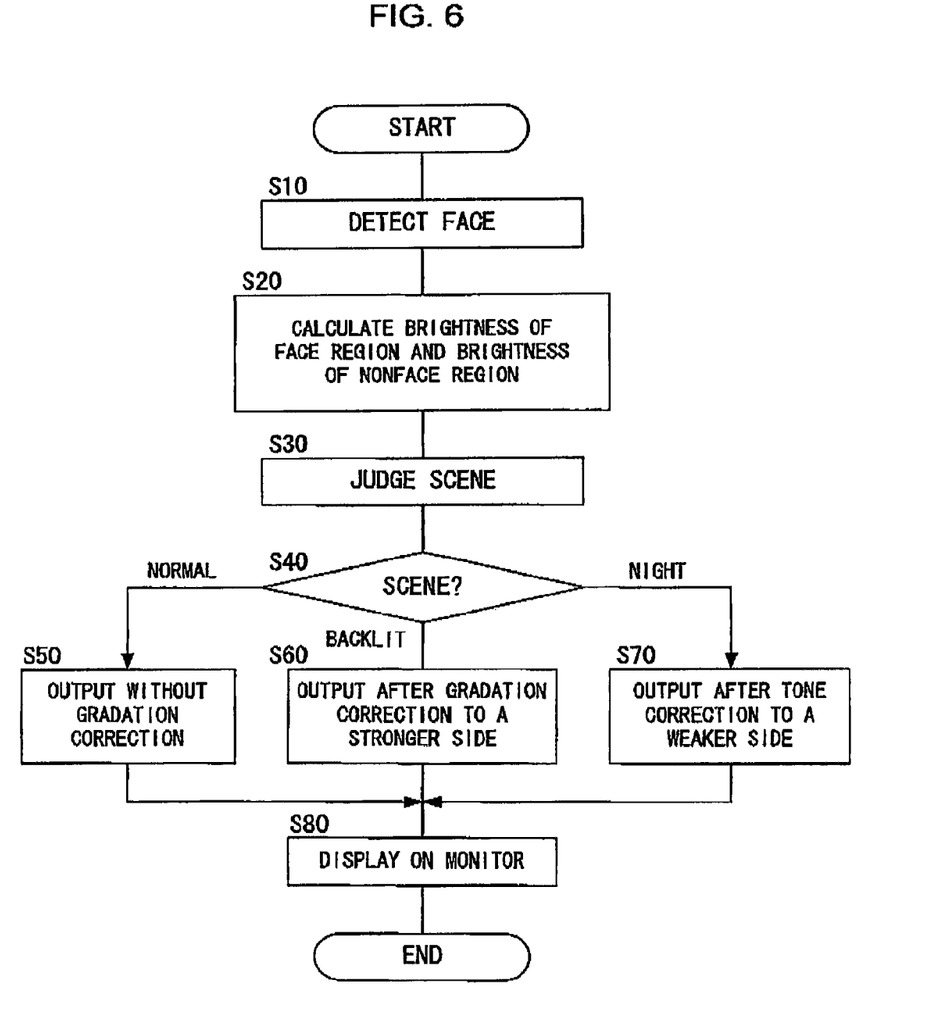
FIG. 6 is a flowchart showing the flow of processing in an editing device according to the present embodiment.

FIG. 6 is a flowchart showing the flow of processing in an editing device according to the present embodiment. The processing shown in FIG. 6 is achieved as follows. That is, when the inputting device 101 is operated by the user to instruct start of image processing, the image processing program is executed by being read from the memory 102 to the controlling device 103 and started up.

In step S10, face detection processing is performed to the image that is a subject of image processing as described above to detect a region including a face in the image, i.e., a face region. Then, the procedure proceeds to step S20, where the brightness of the face region and the brightness of the nonface region are calculated and the procedure proceeds to step S30. In step S30, the scene of the image is judged based on the calculated brightnesses of the face region and the nonface region as described above. Thereafter, the procedure proceeds to step S40.

In step S40, a judgment is made as to which one of a normal scene, a backlit scene and a night scene the judged scene of the image is. If the scene of the image is judged to be a normal scene, the procedure proceeds to step S50 and tone correction processing is performed by setting the value of the Shadow parameter to 0 as described above. That is, no tone correction is performed. On the other hand, if the scene of the image is judged to be a backlit scene, the procedure proceeds to step S60 and tone correction processing is performed by setting the parameter value to a stronger side, e.g., 75.

Further, if the scene of the image is judged to be a night scene, the procedure proceeds to step S70 and tone correction processing is performed by setting the parameter value to a weaker side, e.g., 25. Subsequently, the procedure proceeds to step S80 and the image after tone correction is output and displayed on the monitor 104 to complete the processing.

According to the present embodiment detailed as above, the following advantageous effects can be obtained.

(1) The face region of a person is detected from an image and the scene of the image is judged based on the pixel value of the face region of a person and the pixel value of a region other than the face region of a person, i.e., nonface region, so that since we can consider that the face of a person is generally a main image, the main image can be detected with high precision and the scene can be judged correctly.

(2) Different tone correction is performed depending on the scene of the correctly judged image as described above, so that optimal correction can be performed scene by scene.

(3) After detection of the face region in the image by performing the face detection processing, the scene of the image is judged based on the brightness of the face region and the brightness of the nonface region. Then, tone correction is performed by determining the value of the tone correction parameter that makes the image brighter depending on the judged scene. As a result, the face of a person, which usually is a main subject in images, can be corrected to an optimal brightness.

(4) The value of the tone correction parameter is determined based on a score distribution of values of the parameter that can make the whole image brighter while keeping the contrast on the same level for each scene. As a result, taking into consideration that the score distribution of the parameter value that can make the whole image brighter while keeping the contrast on the same level may differ scene by scene, an optimal parameter value can be determined scene by scene.

(5) Upon the judgment of the scene of the image based on the brightness of the face region and the brightness of the nonface region, the region that shows the distribution of brightness as shown in FIG. 2 is divided as shown in FIG. 3. A judgment is made as to which region in FIG. 3 the point identified by the brightness of the face region and the brightness of the nonface region is included in. As a result, the scene judgment can be performed with high precision taking into consideration that the color of the face of a person, i.e., the skin color, and the color of the others, i.e., background color have different distributions of brightness one from another.

VARIATION EXAMPLE

It is to be noted that the image processing device according to the above-described embodiment can be modified as follows.

(1) In the above-mentioned embodiment, an example has been explained in which an average value of brightnesses of pixels contained in the face region and an average value of brightnesses of pixels contained in the nonface region are calculated and defined as the brightness of the face region and the brightness of the nonface region, respectively, for use in a judgment of the scene of images. However, the present invention should not be considered to be limited to this example and the brightness of each region can be calculated by another method; for example, the brightness of any one pixel contained in the face region and the brightness of any one pixel contained in the nonface region may be defined as the brightnesses of the regions, respectively.

(2) While in the above-mentioned embodiment, an example has been explained in which the Shadow parameter is used as a tone correction parameter, the present invention should not be considered to be limited to this example. Tone correction may be performed using any other parameter that can correct the brightness of the image. It is to be noted that when a parameter other than the Shadow parameter is used, it is necessary to set optimal values of the parameter depending on each scene in advance.

Figure 7:
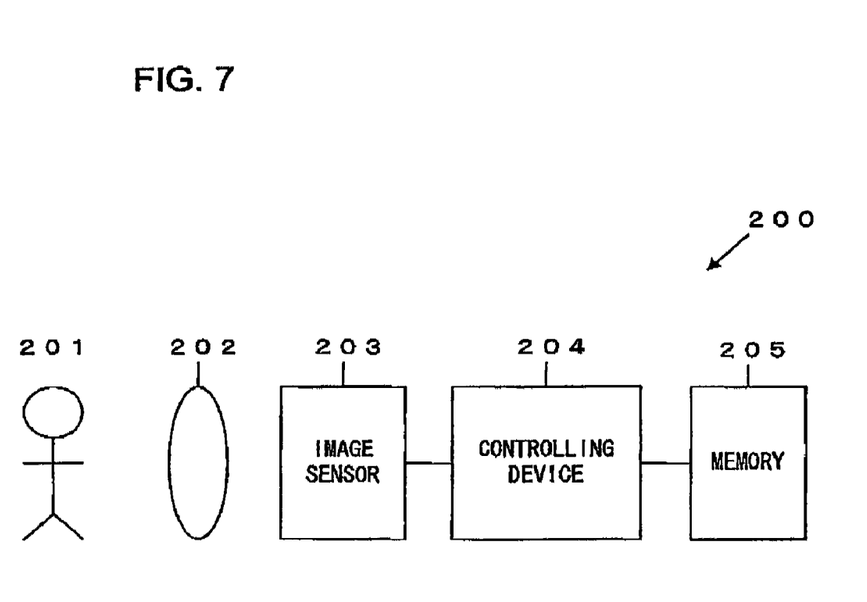
FIG. 7 is a diagram showing a construction of a digital camera.

(3) While in the above-mentioned embodiment, an example has been explained in which the image processing device 100 is, for example, a personal computer, the present invention should not be considered to be limited thereto and any other information terminal may be used. In addition, the above-mentioned image processing program may be installed in a digital camera and the above-mentioned tone correction processing may be performed on the digital camera to the image the user has taken by the digital camera. FIG. 7 is a diagram showing the construction of the digital camera 200 being an imaging device (an image-capturing device). An image sensor 203 such as a CCD captures an image of a subject 201 through a photographing lens 202. A controlling device 204 creates image data based on an output signal from the image sensor 203 and stores the image data in a memory 205. The controlling device 204 performs image processing such as the above-mentioned tone correction processing to the image data stored in the memory 205. The image processing is performed by executing the image processing program stored in the memory 205.

(4) In the above-mentioned embodiment, the scene of images is judged based on brightness. However, the present invention should not be considered to be limited to brightness but the scene may be judged based on any other parameter that indicates lightness of each pixel, such as luminance. It is only necessary that such parameters show a degree of lightness and any parameter that can be derived from the pixel value of each pixel may be used.

Figure 8:
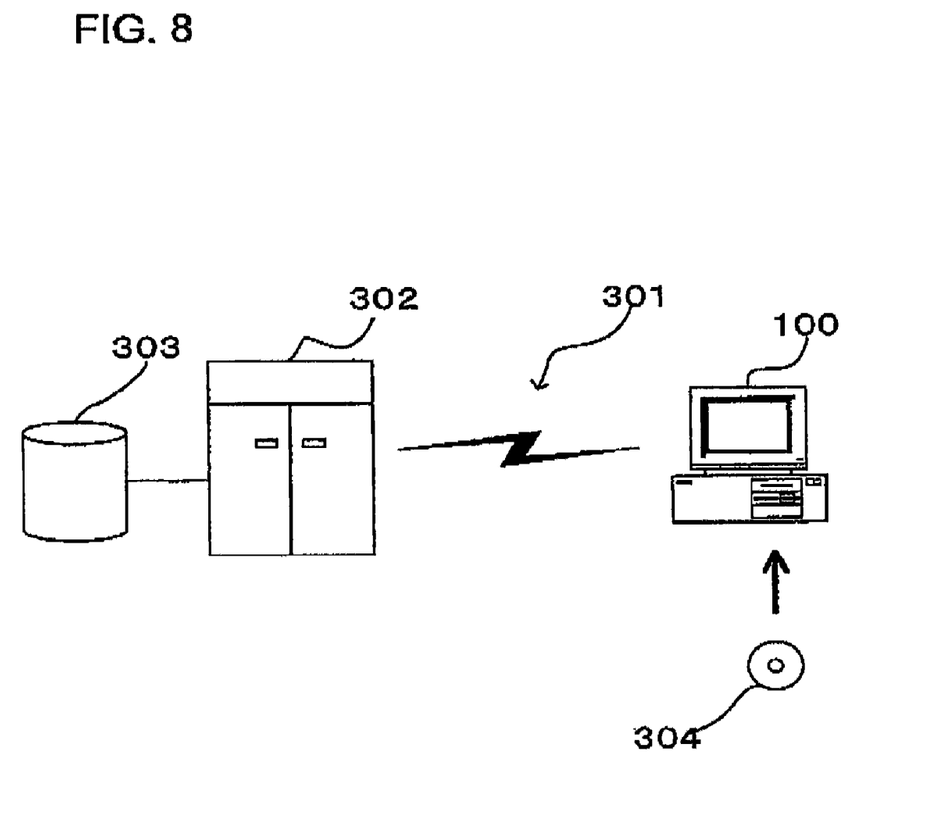
FIG. 8 is a diagram showing a manner in which an image processing program is provided to an image processing device.

(5) In the above-mentioned embodiment, explanation has been made that the image processing program is stored in the memory 102. The image processing program can be provided to the image processing device (personal computer) 100 through a recording medium such as CD-ROM or through data signal such as the Internet. FIG. 8 is a diagram illustrating this situation. The image processing device 100 is provided with an image processing program through a CD-ROM 304. In addition, the image processing device 100 has a connect function with a communication line 301. A computer 302 is a server computer that provides the above-mentioned image processing program and stores the image processing program in a recording medium such as a hard disk 303. The communication line 301 is a communication line such as the Internet or a privately-leased communication line. The computer 302 reads the image processing program from the hard disk 303 and transmits the read-out program to the image processing device 100 through the communication line 301. That is, the image processing program is embodied as a data signal on a carrier wave and transmitted through the communication line 301. As described above, the image processing program can be supplied as a computer-readable computer program product in various forms such as a recording medium or carrier wave.

(6) In the above-mentioned embodiment, explanation has been made that the image data that is an object of image processing is stored in the memory 102. The image data can be acquired by the image processing device 100 through a recording medium such as CD-ROM or through data signal such as the Internet like the above-mentioned image processing program. In addition, the image processing device 100 may acquire the image data through connection with the digital camera through, for example, a USB interface cable.

(7) In the above-mentioned embodiment, explanation has been made on an example of the known Retinex tone correction processing as the tone correction processing. However, the tone correction in the present invention includes not only correction of number of stages indicating brightness ranging from a bright section to a dark section or degree of change thereof but also correction of pixel values to optimal values for a human to observe the image.

It is to be noted that the present invention is not limited to the construction of the above-mentioned embodiment as far as the characteristic functions of the present invention are not damaged.

The disclosure of the following basic application on which the present application claims priority is herein incorporated by reference:

Japanese Patent Application No. 2005-163814 filed Jun. 3, 2005.

The invention claimed is:

1. An image processing method, comprising:
   detecting a face region of a person from an image formed by a plurality of pixels, and
   judging a scene of the image based on a pixel value of the detected face region of the person and a pixel value of a nonface region excluding the face region in the image to be one of a normal scene, a backlit scene or a night scene, wherein:
   when the scene of the image is judged based on the pixel value of the face region and the pixel value of the nonface region,
   (1) the scene of the image is judged to be the normal scene, if a difference between the pixel value of the face region and the pixel value of the nonface region is less than a predetermined value,
   (2) the scene of the image is judged to be the backlit scene, if the pixel value of the nonface region is greater than the pixel value of the face region by a predetermined value or more, or
   (3) the scene of the image is judged to be the night scene, if the pixel value of the face region is greater than the pixel value of the nonface region by a predetermined value or more.

2. An image processing method according to claim 1, further comprising:
   performing different tone correction to the image depending on the judged scene of the image.

3. An image processing method according to claim 1, further comprising:
   setting a parameter value of a tone correction parameter for performing tone correction to the image depending on the judged scene of the image; and performing tone correction to the image based on the set parameter value.

4. An image processing method comprising:

detecting a face region of a person from an image formed by a plurality of pixels;

judging a scene of the image based on a pixel value of the detected face region of the person and a pixel value of a nonface region excluding the face region in the image to be one of a normal scene, a backlit scene or a night scene; and setting a distribution of a set of the pixel value of the face region and the pixel value of the nonface region divided in advance into a range corresponding to the normal scene, a range corresponding to the backlit scene, and a range corresponding to the night scene, wherein:

the judging a scene is performed by judging which one of the ranges set by the scene setting unit the set of the pixel of the face region and the pixel of the nonface region of the image is included in.

5. An image processing method according to claim 3, wherein:

the tone correction parameter is a parameter that controls the pixel value of each pixel of the image; and the parameter value is set (4) so as not to perform tone correction to the image, if the scene of the image is judged to be the normal scene, (5) so that tone correction is performed to make the image brighter than the original image, if the scene of the image is judged to be the backlit scene, or (6) sets the parameter value so that tone correction is performed to make the image brighter than the original image but more weakly than the tone correction in the backlit scene, if the scene of the image is judged to be the night scene.

6. A non-transitory computer readable medium comprising an image processing program for causing a computer to execute the image processing method according to claim 1.

7. An imaging device comprising:

an image sensor that captures an image;

a storing unit that stores therein the image captured by the image sensor;

a controlling unit that executes the image processing method according to claim 1;

wherein:

the controlling unit performs tone correction processing to the image stored in the storing unit.

8. An image processing device comprising:

a controlling device that executes an image processing method according to claim 1.

9. An image processing device comprising:

a controlling device that executes an image processing method according to claim 2.

10. An image processing device comprising:

a controlling device that executes an image processing method according to claim 3.

11. An image processing device comprising:

a controlling device that executes an image processing method according to claim 4.

12. An image processing device comprising:

a controlling device that executes an image processing method according to claim 5.

* * * * *